Aug. 1, 1967     KWANGHO CHUNG ET AL     3,333,443
WASHING MACHINE
Filed May 19, 1965                5 Sheets-Sheet 1
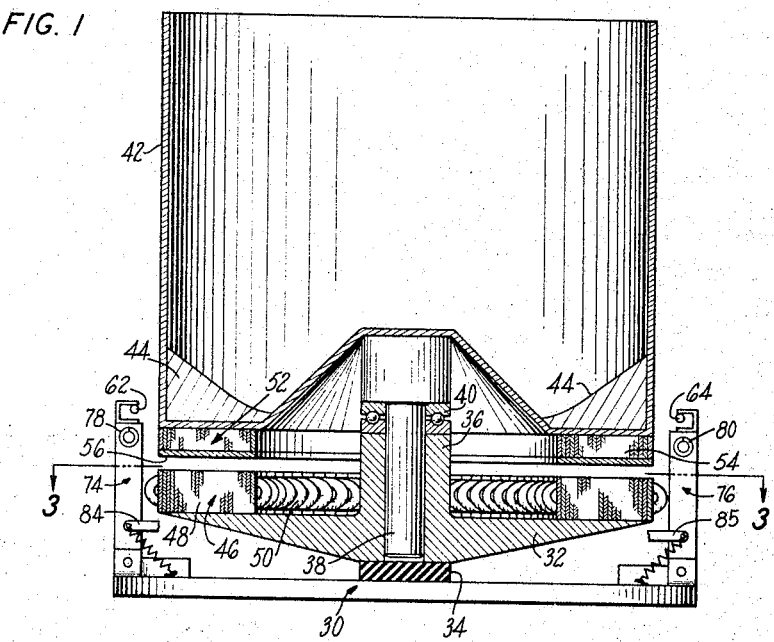
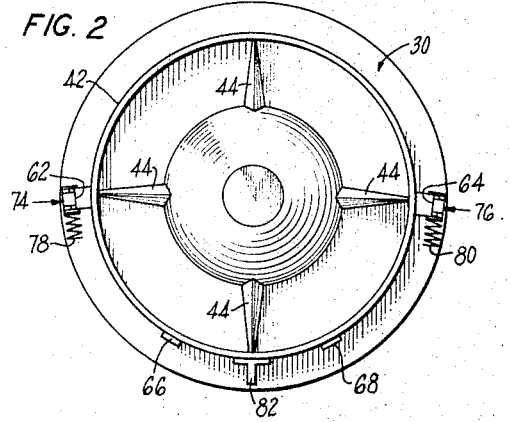
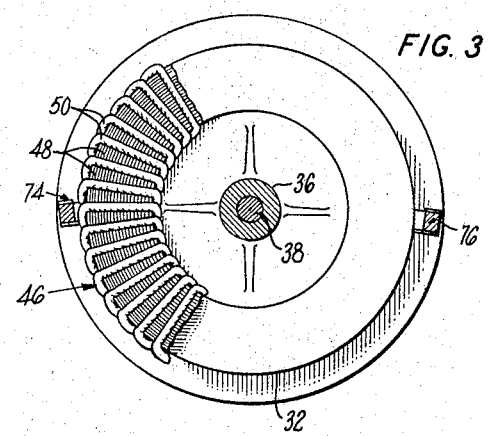
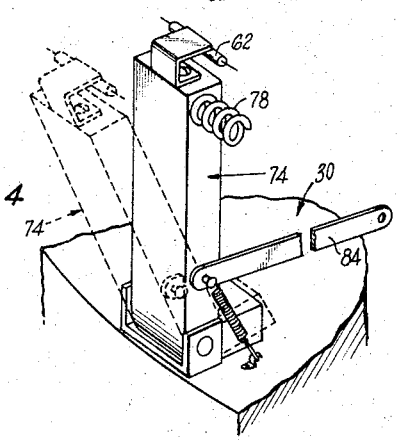
*INVENTORS*
KWANGHO CHUNG
GERALD A. FRANCIS
BY
*Lindsey, Prutzman and Hayes*
ATTORNEYS

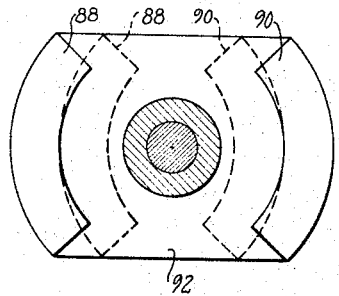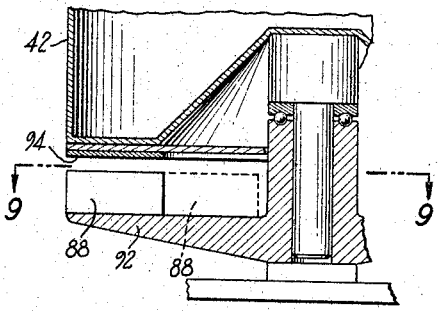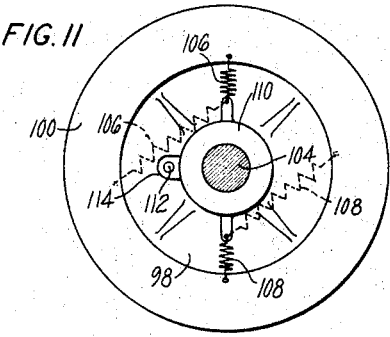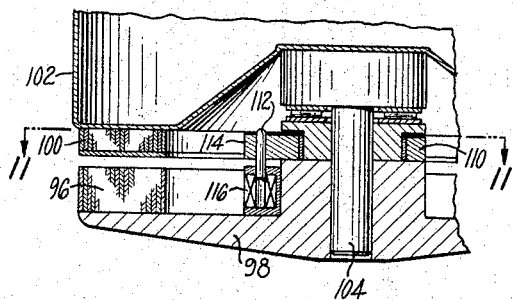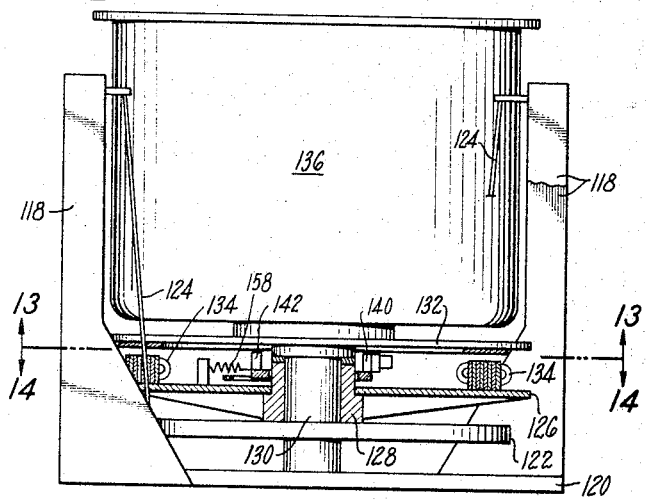

Aug. 1, 1967 KWANGHO CHUNG ET AL 3,333,443

WASHING MACHINE

Filed May 19, 1965 5 Sheets-Sheet 4

INVENTORS
KWANGHO CHUNG
GERALD A. FRANCIS
BY
*Lindsey, Prutzman and Hayes*
ATTORNEYS Aug. 1, 1967    KWANGHO CHUNG ET AL    3,333,443
WASHING MACHINE
Filed May 19, 1965    5 Sheets-Sheet 5
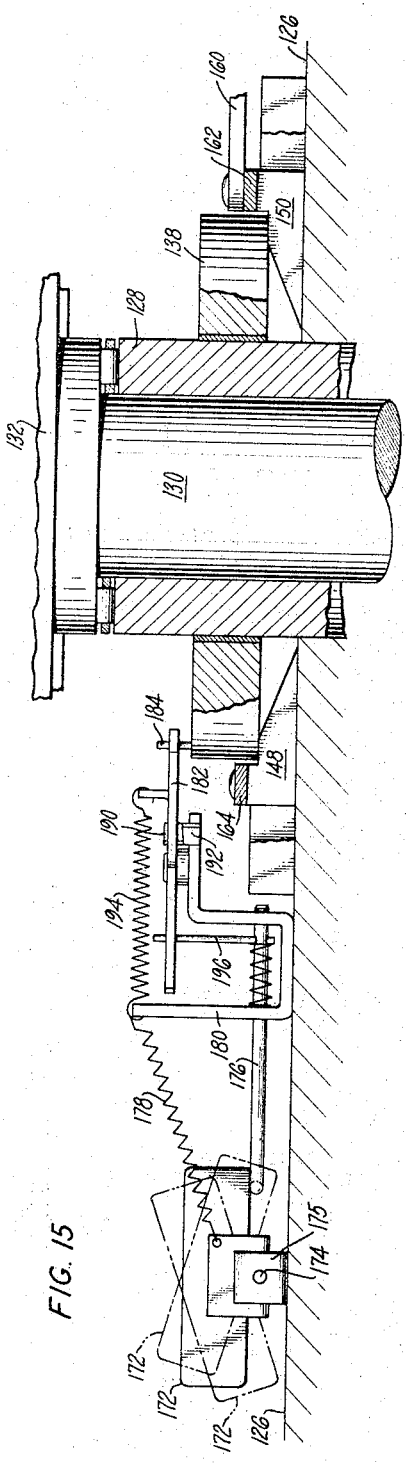
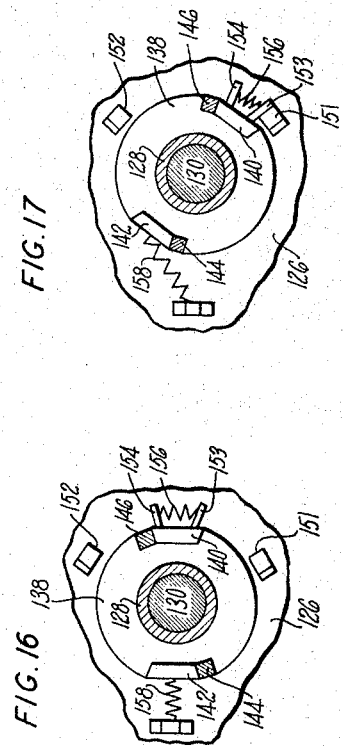
FIG. 17
FIG. 16
INVENTORS
KWANGHO CHUNG
GERALD A. FRANCIS
BY
*Lindsey, Prutzman and Hayes*
ATTORNEYS United States Patent Office 3,333,443
Patented Aug. 1, 1967

3,333,443
WASHING MACHINE
Kwangho Chung, Hartford, Conn., and Gerald A. Francis, Columbus, Ohio, assignors to Skinner Precision Industries, Inc., New Britain, Conn., a corporation of Connecticut
Filed May 19, 1965, Ser. No. 457,042
15 Claims. (Cl. 68—23)

This invention relates to laundry apparatus and more particularly concerns an electromagnetic drive system for rotating and oscillating a laundry tub in which clothes may be washed and at least partially dried.

One of the objects of the present invention is to provide an electromagnetic drive system for laundry apparatus in which electromagnetic force is utilized directly to drive a laundry tub about its axis of rotation thus eliminating the need for mechanical driving components such as for gears, pulleys, belts and the like.

Another object of the present invention is to provide an electromagnetic drive system for rotary laundry tubs in which mechanical wear is reduced to a minimum and the noise level during operation is similarly reduced.

Still another object of this invention is to provide an electromagnetic drive system for rotary laundry tubs which may be electrically reversed at suitable intervals to cause the tub to oscillate about its axis and thereby agitate its contents, and which may also be rotated continuously in one direction to provide a spin drying cycle.

A further object of this invention is to provide an electromagnetic drive system for laundry tubs in which heat generated by the drive system is transferred to the contents of the tub.

Other objects will be in part obvious and in part pointed out more in detail hereinafter.

The invention accordingly consists in the features of construction, combination of elements and arrangement of parts which will be exemplified in the construction hereafter set forth and the scope of the application which will be indicated in the appended claims.

In the drawings:

FIG. 1 is a side view, in section, of a washing machine embodying the drive system of the present invention;

FIG. 2 is a top plan view of the washing machine shown in FIG. 1;

FIG. 3 is a cross sectional view taken along the line 3—3 in FIG. 1;

FIG. 4 is an enlarged perspective view of a portion of the machine shown in FIG. 1;

FIG. 8 is a schematic view, in section, of another embodiment of the present invention;

FIG. 9 is a sectional view taken along the line 9—9 in FIG. 8;

FIG. 10 is a schematic view of still another embodiment;

FIG. 11 is a cross sectional view taken along the line 11—11 in FIG. 10;

FIG. 12 is a side view, in section, of a laundry machine incorporating another embodiment of the present invention;

FIG. 15 is a cross sectional view taken along the line 15—15 in FIG. 14;

FIG. 16 is a schematic view generally similar to FIG. 14 illustrating the mode of operation of the invention; and FIG. 17 is similar to FIG. 16 but shows the parts in a different position.

Figure 5:
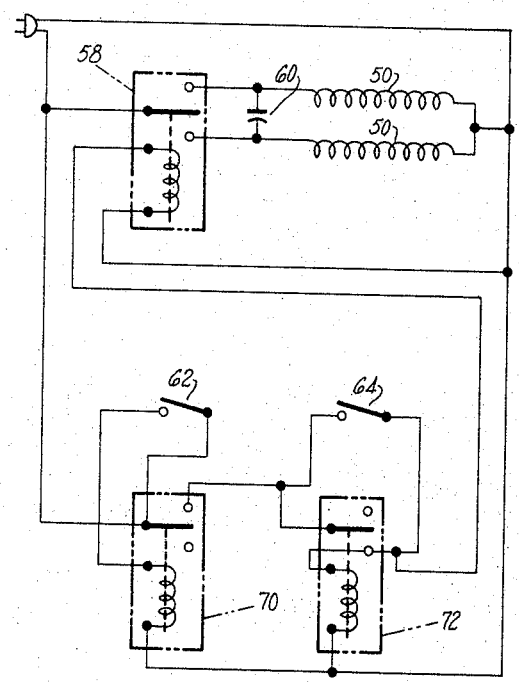
FIG. 5 is a schematic wiring diagram of the control circuit for the drive system of the laundry machine of FIG. 1.

The motive power for driving each of the laundry machines illustrated in the drawings is preferably supplied by an induction motor of the general type disclosed in United States application Ser. No. 400,175, filed Sept. 29, 1964, by K. Chung and G. A. Francis although other types may be used. Briefly, motors of this type adapted to provide rotary motion comprise a stator having a laminated ferro-magnetic core structure provided with a series of angularly spaced slots in which are located a plurality of field coils of conventional coiled electrical conductor configuration arranged in the stator slots to form a two-layer single coil lap wound stator. The field coils are electrically connected to a suitable multi-phase alternating current source thereby to produce an electromagnetic field which in accordance with conventional induction motor theory moves along the slotted surface of the stator. Cooperating with the stator is an armature or driven member of disc-like configuration comprising a continuous conductor formed from a conducting material such as copper and a ferro-magnetic member of similar configuration forming the return path for electromagnetic flux produced by the stator.

Turning now to the embodiments of the present invention illustrated in the drawings, there is illustrated in FIGS. 1–7 a laundry machine comprising a base 30 upon which is mounted a stator frame 32 by means of a vibration damper 34 which maintains the stator frame 32 in fixed relation to the base 30 while minimizing the transmission of mechanical shock and vibration to the surface on which the base 30 is mounted. The stator frame 32 is formed with a central bearing sleeve 36 arranged to rotatably support a shaft 38 provided with a thrust bearing 40 for supporting the weight of a laundry tub 42 mounted thereon. The tub 42 is of generally cylindrical configuration and is provided with a suitable number of agitating fins 44 in the bottom portion thereof. It will be understood that appropriate means are provided for admitting water into the tub 42, for draining the water and for performing related functions, but inasmuch as the present invention is concerned with the drive system for the tub 42 these components are not illustrated in the drawings.

The drive system of the present invention comprises a stator 46 of generally circular configuration supported on the stator frame 32 underlying the tub 42. The stator 46 comprises a slotted stator core 48 formed of suitable magnetic material and a plurality of overlapping windings or coils of wire 50 arranged to produce a moving electromagnetic field along the surface of the stator core 48 when energized from a suitable multi-phase alternating current source. Cooperating with the stator 46 is a rotor 52, likewise of generally circular configuration, secured in heat transfer relation to the bottom surface of the tub 42 and separated from the surface of the stator 46 by a suitable air gap. The rotor 52 comprises a disc-like member 54 of magnetic material such as mild steel, and an underlying layer 56 of conductive material, such as copper. Thus, upon energization of the stator coil 50 a rotating electromagnetic force along the surface of the stator 46 cooperates with the rotor 52 to cause rotation of the tub 42, and the heat produced by the eddy currents induced in the rotor 52 is utilized to heat the tub 42.

The drive system of the present invention may be utilized to drive the tub of a laundry machine of the top-loading type or of the front-loading type. In machines of the top-loading type, the axis of rotation of the tub is vertical and washing action; i.e., agitation of the clothes in the washing solution, is accomplished by periodic oscillations of the tub. In machines of the front-loading type the axis of rotation of the tub is either horizontal or inclined at an angle of about 45 degrees or less, and the tub is rotated continuously in one direction so as to cause the clothes to tumble within the washing solution. In machines of both types, the washing fluid is extracted from the clothes by spinning the tub at a higher rate of speed than is the case during washing action so as to extract the fluid by centrifugal force. While the embodiments of the present invention disclosed herein are associated with the washing machines of the top-loading vertical axis type so as to illustrate the manner in which the laundry tub may be oscillated during washing operations, it will be understood that in its broader aspects, the invention may be utilized in conjunction with machines of the front-loading generally horizontal axis type.

Referring to FIG. 5 which illustrates a suitable control circuit for the laundry machine shown in FIG. 1, there is provided an energizing circuit for the stator windings 50 which includes a reversing relay 58 arranged to cooperate with a phase splitting capacitor 60 so as to cause the electromagnetic field along the surface of the stator 46 to reverse its direction of movement at appropriate intervals. In performing this function, the relay 58 is periodically energized and de-energized by a pair of magntic reed type proximity switches 62 and 64 which are mounted adjacent the peripheral surface of the tube 42 in diametrically opposed relation to each other. The proximity switches 62 and 64 cooperate with a pair of permanent magnets 66 and 68 secured to the periphery of the tub 42 in positions which periodically bring them in close proximity to the switches 62 and 64 as the tub 42 rotates about its axis. As shown in FIG. 2, in accordance with the embodiment of the invention being described, the switches 62 and 64 and the magnets 66 and 68 are so positioned that the tub 42 oscillates through an arc of approximately 180 degrees. As the tub 42 approaches the end of its arc of travel either the switch 62 and the magnet 66 or the switch 64 and the magnet 68 cooperate to actuate the relay 58 and cause a reversal of the direction of movement. As shown in FIG. 5, the switches 62 and 64 are connected in circuit with a pair of holding relays 70 and 72 which function to maintain the circuit established by the switches 62 and 64, respectively, after each of the switches in turn has been momentarily energized by the magnet 66 or the magnet 68 as the case may be.

In order to utilize some of the kinetic energy of the tub 42 as it oscillates, a pair of pivoted brackets 74 and 76 are mounted on the frame 30 adjacent the periphery of the tub 42 so as to provide support for a pair of coil springs 78 and 80 arranged to be engaged by a stop member 82 secured to the tub 42. The switches 62 and 64 may likewise be conveniently mounted on the pivoted brackets 74 and 76. During washing operations the pivoted brackets 74 and 76 occupy the positions shown in FIG. 1 so that the springs 78 and 80 lie in the path of movement of the stop member 82. Thus, for example, as the magnet 66 is carried past the switch 62 as the tub 42 moves clockwise the relay 58 is actuated to reverse the direction of movement of the tub 42 and at the same time the stop member 82 engages the spring 78 whereupon a counterclockwise force is applied to the tub 42 by the spring 78 so as to provide additional force for rotating the tub 42 in the counterclockwise direction.

When washing fluid is to be extracted from the clothes after a washing operation, continuous rotation of the tub 42 at a speed higher than its previous washing speed is necessary and for this purpose means are provided for disabling the motion reversal circuit and at the same time increasing the speed of rotation. As best illustrated in FIG. 4, the pivoted bracket 74 is provided with an actuator arm 84 for shifting the proximity switch 62 and the spring 78 away from the path of movement of the periphery of the tub 42. Similarly, an actuator arm 84 is attached to the pivoted bracket 76. The actuator arms 84, 85 may be operated either manually or by suitable automatic sequence control means (not shown). In this way the brackets 74, 76 may be shifted away from the tub 42 so that the path of movement of the stop member 82 is unimpeded by the springs 78 and 80 and the switches 62 and 64 are sufficiently displaced from the magnets 66 and 68 to be uninfluenced thereby.

Figure 6:
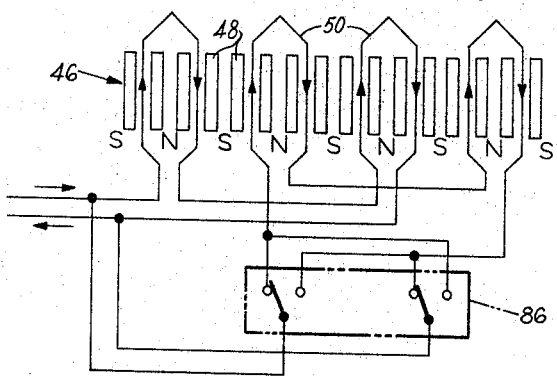
FIG. 6 is a schematic wiring diagram of the stator portion of the drive system.
Figure 7:
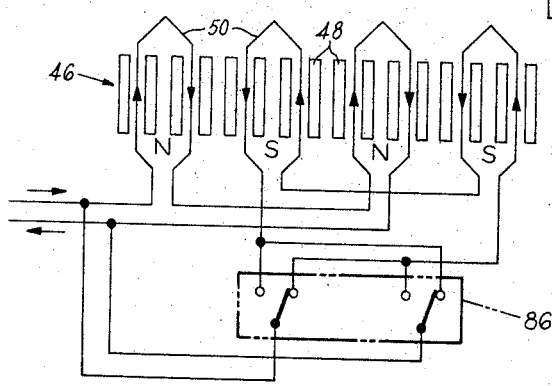
FIG. 7 is similar to FIG. 6 but shows the circuit connections utilized to alter the speed of the drive system.
Figure 13:
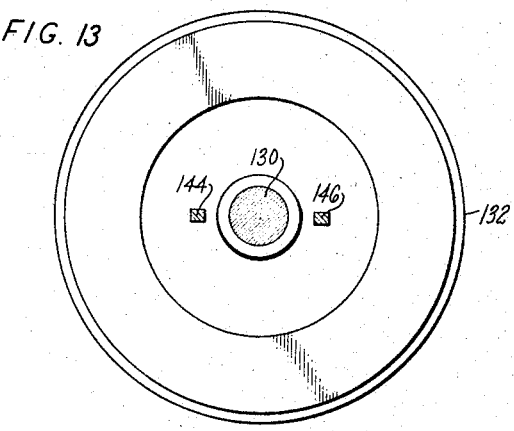
FIG. 13 is a cross sectional view taken along the line 13—13 in FIG. 12.
Figure 14:
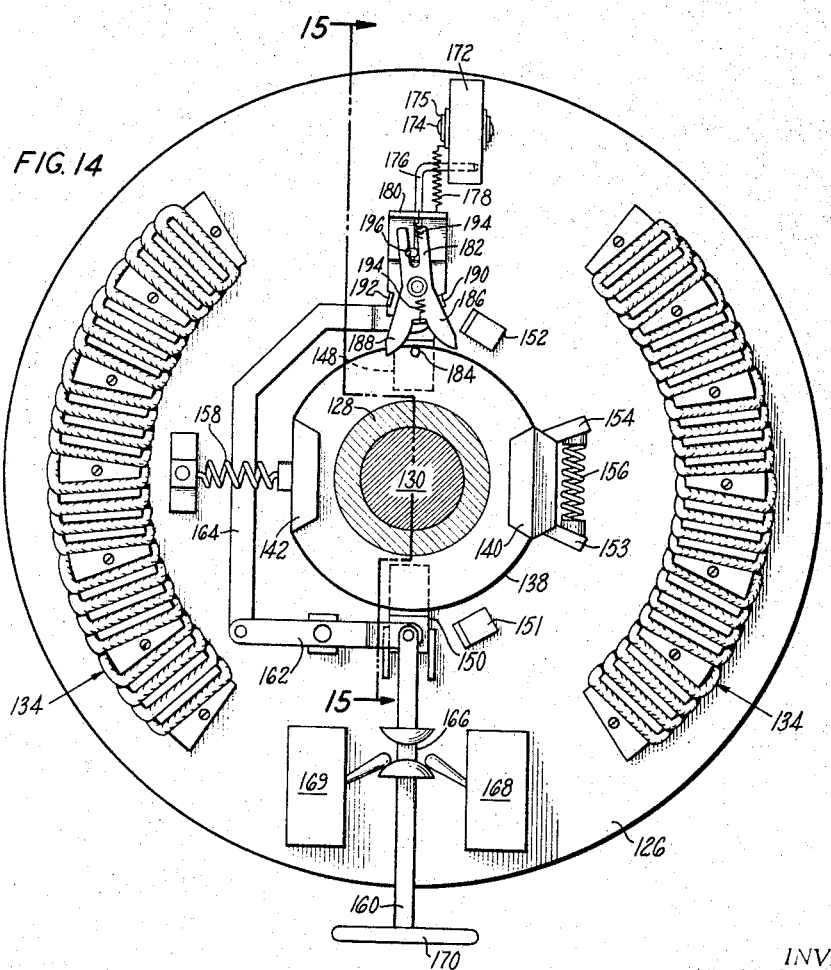
FIG. 14 is an enlarged cross sectional view taken along the line 14—14 in FIG. 12.

For the purpose of increasing the speed of rotation of the tub 42 during each spin dry cycle the stator winding switching arrangement schematically illustrated in FIGS. 6 and 7 may be employed. Briefly, this arrangement makes use of the consequent pole method of varying the speed of an induction motor by a factor of two to one. Referring to FIG. 6 there is illustrated a segment of the stator 46 including four full pitch coils 50 in one of the phase legs of the stator windings connected in circuit with a double pole, double throw speed changing switch 86. It will be understood that a similar switch is connected in circuit with the other phase leg of the windings.

During relatively slow speed washing operations the switch 86 is shifted to the position shown in FIG. 6 so as to produce a flow of current in the coils 50 in the direction indicated by the arrows and thereby cause eight alternate north and south poles to appear along the stator 46. When a spin dry cycle is to be initiated, the switch 86 is shifted to the position shown in FIG. 7 so as to alter the direction of current flow as shown therein and cause each winding 50 to become a one-half pitch coil with the result that the number of alternate north and south poles along the illustrated segment of the stator 46 become four in number rather than eight. Under these circumstances the synchronous speed of the drive system is doubled and the tub 42 is rotated at the higher speed required for spin drying operation.

Another arrangement for altering the speed of rotation of the tub 42 is schematically illustrated in FIGS. 8 and 9 in which a pair of stator segments 88 and 90 are mounted on a stator frame 92 so as to be radially movable between an outer position as shown in full lines and an inner retracted position illustrated in broken lines. As the stator segments 88 and 90 are moved inwardly from their outermost positions the speed of rotation of the rotor 94 is increased sufficiently to achieve spin drying. Inasmuch as the torque required to spin the laundry tub 42 is less than the torque required to oscillate it during washing operations, the decrease in torque resulting from the inward movement of the stator segments 88 and 90 is insufficient to interfere with proper operation of the apparatus.

In the embodiment of the invention illustrated in FIGS. 10 and 11 an alternative arrangement for shifting the laundry machine from washing operations to spin drying operations and vice versa is utilized. In this embodiment a stator 96 mounted on a fixed stator frame 98 cooperates with a rotor 100 to drive a laundry tub 102 supported on a rotary shaft 104. For the purpose of facilitating periodic reversals in the direction of rotation of the tub 102 during washing operations, a pair of tension springs 106 and 108 are provided which are arranged to interconnect the stator support 98 and the rotor 100. The springs 106 and 108 are connected at one end to the rotor 100 and extend inwardly to engage a rotatable collar 110 mounted on the stator support 98 for rotation concentrically with respect to the axis of rotation of the tub 102. During washing operations the collar 110 is fixedly secured to the stator frame 98 by means of a pin 112 which may be driven upwardly into engagement with an apertured ear 114 on the collar 110 by a solenoid 116. When the collar 110 is secured in this manner, the springs 106 and 108 are extended to the positions indicated in broken lines in FIG. 11 each time the tub 102 reaches the end of its travel in one direction or the other and thus some of the kinetic energy of the tub is utilized to facilitate its return movement. During spin dry operations the pin 112 is retracted from engagement with the ear 114 of the collar 110 and hence the springs 106 and 108 are unrestrained as the rotor 100 rotates, as is the collar 110.

Referring now to the embodiment of the present invention illustrated in FIGS. 12–18, the laundry machine illustrated therein comprises four spaced upright corner posts 118 secured to the corners of a square stationary base 120 and upon which is mounted a floating base 122 supported from the posts 118 by means of flexible suspension cords 124 made of nylon, for example. Secured to the floating base 122 is a stator frame 126 having a cylindrical journal 128 centrally located thereon and arranged to support a rotary shaft 130. A rotor 132 is secured to the shaft 130 and arranged to cooperate with a stator 134 formed in two oppositely disposed arcuate sections. Secured to the rotor 132 for rotation therewith is a laundry tub 136 of conventional form.

As in the previously described embodiments, it is necessary to provide means for oscillating the tub about its axis during washing operations and also rotating it at a higher speed in one direction for spin drying operations. Accordingly, there is provided a hub ring 138 rotatably mounted on the central bearing portion of the stator frame 126 so that it may be shifted axially between a lower position in which it does not interfere with continuous rotation of the tub 136 and an upper position in which it cooperates with other components to cause the tub 136 to oscillate about its axis. The hub ring 138 is formed with a pair of diametrically opposed hub ring stops 140 and 142 on its upper surface which, when the hub ring 138 is raised to an elevated position, are located in the circular path of movement of a pair of rotor stop members 144 and 146 fixedly secured to and depending from the bottom surface of the rotor 132. The rotor stop members 144 and 146 are likewise located in diametrically opposed positions on the rotor 132.

The hub ring 138 is movable from a lower position resting on the stator frame 126 to a raised position as previously described in which the hub ring stops 140 and 142 are located along the path of travel of the rotor stops 144 and 146. The hub ring 138 is raised to its upper position by a pair of sliding wedges 148 and 150 mounted on the stator frame 126 on diametrically opposed sides of the axis of rotation of the tub 136. The wedges 148 and 150 may be operated from an outer position in which they do not engage the hub ring 138 to an inner position in which they cause the hub ring 138 to be lifted to its uppermost position. In the latter position, the hub ring 138 cooperates not only with the rotor stops 144 and 146 but also with a pair of fixed stops 151 and 152 fixedly secured to the stator frame 126 located radially outwardly from the hub ring 138 and angularly spaced apart a distance somewhat less than 180 degrees. The function of the fixed stops 151 and 152 is to limit the arc of movement of the hub ring 138 and for this purpose a pair of shock absorber arms 153 and 154 are mounted on the hub ring 138 for limited pivotal movement about axes parallel to the axis of rotation of the tub 136 and are normally held apart by a compression spring 156. When the hub ring 138 is not in motion it is held in the position shown in FIG. 14 by a centering spring 158 secured at one end to the stator frame 126.

The sliding wedges 148 and 150 may be shifted inwardly to raise the hub ring 138 or shifted outwardly to lower it by a linkage assembly which comprises a control rod 160 longitudinally movable so as to shift the sliding wedge 150 and also operate a pivoted link 162 which in turn is operatively connected to an extension arm 164 secured to the sliding wedge 148. The control rod 160 is also utilized to control the rotary speed of the tub 136 so that the desired increase in speed occurs each time the hub ring 138 is shifted to its lower position; in which the thub 136 is free to rotate freely. Accordingly, the control rod 160 includes a switch actuator 166 arranged to cooperate with the speed change switch 168, 169 connected in circuit with the windings of the stator 134, and to actuate the switch 168, 169 so as to energize the stator 134 for low speed operation when the tub 136 oscillates and to condition the stator 134 for high speed operation when the tub 136 is free to rotate continuously. The manner in which the switches 168, 169 function to change the speed of rotation of the tub 136 is schematically illustrated in FIGS. 6 and 7 and is described above. In the illustrated embodiment of the invention, a manual cycle control handle 170 is secured to the control rod 160, but it will be understood that the control rod 160 may be actuated automatically by means of a timer controlled solenoid for example.

For purpose of periodically reversing the direction of movement of the electromagnetic field along the stator 134, during each washing cycle, there is provided a single-pole, double throw mercury tilt switch 172 appropriately connected in circuit with the windings of the stator 134 and a phase-splitting capacitor (not shown). The mercury switch 172 is mounted for tilting movement on the stator frame 126 by means of a shaft 174 and a bracket 175, and is biased into engagement with an actuator rod 176 by a spring 178 secured to a bracket 180 which also supports the actuator rod 176. Also mounted on the bracket 180 for pivotal movement about an axis parallel to the axis of rotation of the tub 136 is a flipper member 182 arranged to be periodically actuated by an upright post 184 mounted on the hub ring 138 when the hub ring 138 is in its uppermost position. The flipper member 182 includes bifurcated end portions 186, 188 extending into the path of movement of the post 184 which are so shaped that the flipper member 182 is shifted either into engagement with the stop member 190 or the stop member 192 on the bracket 180 during oscillatory movement of the post 184, the flipper member 182 being held in each of its two positions in turn by an overcenter spring 194. The opposite end of the flipper member 182 is slotted to receive the upper end of an arm 196 secured to the actuator rod 176 and arranged to rotate the rod 176 first in one direction and then the other, thereby causing periodic actuation of the mercury switch 172. In this manner the phase relation of the two groups of windings on the stator 134 is periodically altered so as to cause periodic reversals of the direction of movement of the electromagnetic field along the stator 134, and the tub 136 is caused to oscillate about its axis.

As the tub 136 oscillates, both its clockwise and counter-clockwise movements are limited by the hub ring 138 which is in its raised position during the washing cycle.

Considering the clockwise movement of the tub 136 and the rotor 132, for example, as the tub and rotor approach the end of their arc of travel, the rotor stops 144, 146 engage the hub ring stops 142, 140 respectively. The hub ring 138 then rotates in unison with the tub and rotor through a small angle (FIGS. 16 and 17) before the arm 153, attached to the hub ring stop 140, is snubbed by its engagement with the stop 151 fixed on the stator frame 126. At this point, the inertia of the rotating components, primarily the tub 136 and its contents, provides torque which is transmitted from the rotor stop 146 to the stator stop 151 through the hub ring stop 140 and its attached arm 153. This torque is applied to the stator frame 126 and the floating base 122 upon which the stator frame 126 is secured, and the base 122, the tub 136 and the driving assembly of the laundry machine are lifted upwardly a short distance about the shaft 130 relative to the fixed frame by means of the inextensible suspension cords 124 secured to the floating base 122.

Due to the suspension of the floating base 122, the rotational energy of the laundry machine is largely conserved when the direction of rotation of the tub 136 is reversed during its oscillation. That is, the kinetic energy of rotation is converted into and stored in the form of potential energy as the floating base 122, and therefore the driving assembly and the tub 136, are raised upwardly. Then as the floating base 122 returns to its lower position, the potential energy of the raised weight is automatically restored as the arm 153, attached to the hub ring stop 140, transmits torque from the stator stop 151 to the rotor stop 146, thereby to assist the above-described electrical means in reversing the direction of rotation of the rotor 132 and the tub 136.

From the foregoing, it will be seen that the present invention provides an improved drive system for laundry machines offering the advantages of mechanical simplicity, quiet operation and high efficiency enhanced by utilization of the waste heat generated in the drive system. Further, the invention is useful in both front loading and top loading laundry machines and provides the necessary speed changes as well as the oscillatory movement required in machines of the latter type.

As will be apparent to persons skilled in the art, various modifications and adaptations of the structure above-described will become readily apparent without departure from the spirit and scope of the invention, the scope of which is defined in the appended claims.

We claim:

1. An electromagnetic drive system for a laundry tub mounted for rotation on a frame comprising a rotor secured to said tub in concentric relation to its axis of rotation, a stator secured to said frame in electromagnetic driving relation to said rotor, means for connecting said stator to a source of alternating current, means for periodically reversing the direction in which said rotor is driven by said stator, a hub ring rotatably supported by said frame in concentric relation to said axis, first stop means on said frame engageable with second stop means on said hub ring for limiting the arc of movement of said hub ring, and said hub ring being axially movable between a first position and a second position, third stop means on said hub ring engageable with fourth stop means on said rotor only when said hub ring is in said first position, and control means for shifting said hub ring between said first and second positions, whereby said third stop means may be disengaged to permit said tub to rotate freely or positioned for engagement with said fourth stop means to limit the arc of movement of said tub.

2. An electromagnetic drive system for a laundry tub as set forth in claim 1 in which said means for shifting said hub ring includes a pair of diametrically opposed wedges supported by said frame for radial movement with respect to the axis of said tub, said wedges being movable between an inner position in which they support said hub ring in its first position to an outer position in which said hub ring rests in its second position.

3. An electromagnetic drive system for a laundry tub as set forth in claim 1 including speed regulating means for causing said stator to drive said rotor at a first speed or a second higher speed, and means for coupling said control means to said speed regulating means so as to cause said tub to move at said first speed when said hub ring is in its first position and at said second speed when said hub ring is in its second position.

4. An electromagnetic drive system for a laundry tub as set forth in claim 1 including electrical switch controlled means for reversing the direction in which said rotor is driven by said stator, a switch for controlling said electrical means, and actuator means for periodically actuating said switch so as to periodically reverse the direction of rotation of said rotor, said actuator means including a first member pivotally mounted on said frame in mechanical engagement with said switch, and a second member mounted on said hub ring for movement about said axis of rotation for periodically shifting the position of said first member when said hub ring is in said first position.

5. A laundry machine comprising a base, a laundry tub rotatably mounted on the base, a motor supported on the base drivingly connected to the tub and having means for periodically reversing the direction of rotation of the tub to cause it to oscillate about its axis of rotation, a fixed frame, a plurality of elongated, inextensible support members having upper and lower portions secured to the frame and base respectively for suspending the base, and therefore the tub and motor, in floating relation to the frame, and means for periodically transmitting torque between the tub and the base to cause the base, tub and motor to be raised and lowered and to assist the directional reversal of the tub.

6. The laundry machine as set forth in claim 5 in which the means for periodically transmitting torque between the tub and the base include a pair of stop members supported by the tub in diametrically opposed relation to its axis of rotation, a hub ring supported for rotation by the base in concentric relation to the axis of rotation of the tub, the hub ring having a stop member fixed thereto engageable with the stop members of the tub in turn as the tub approaches the respective ends of its arc of travel, and stop means supported by the base engageable with the stop member of the hub ring for limiting its arc of movement.

7. A laundry machine comprising a base, a laundry tub supported on the base for rotation about a vertical axis, a motor, the motor including a rotor secured to the tub in concentric relation to its axis of rotation and having a pair of diametrically opposed stops secured on the rotor, a stator secured to the base in axially spaced face-to-face relation to the rotor, means for connecting the stator to a source of alternating current to produce a moving electromagnetic field along the stator to cause rotation of the rotor and tub, and means for periodically reversing the direction of movement of the electromagnetic field to cause the rotor and tub to oscillate about the axis of rotation, a fixed frame, a plurality of elongated, inextensible support members having upper and lower portions secured to the frame and base respectively for suspending the base, and therefore the tub and motor, in floating relation to the frame, and means on the stator engageable with the stops on the rotor for limiting its arc of movement and transmitting torque between the tub and the base, thereby to cause the base, tub and motor to be raised and lowered relative to the frame and to assist in reversing the direction of rotation of the tub.

8. An electromagnetic drive system for a laundry tub mounted for rotation on a frame comprising an annular rotor secured to the tub in concentric relation to its axis of rotation, said rotor having a flat surface perpendicular to said axis, an arcuate stator secured to the frame in axially spaced face-to-face relation with said rotor, said stator having a plurality of coils of wire distributed along its length, means for connecting said coils to a multiphase source of alternating current to produce a moving electromagnetic field along said stator so as to cause rotation of said rotor and tub, means for periodically reversing the direction of movement of said electromagnetic field so as to cause said rotor and tub to oscillate about their axis of rotation, first and second recoil springs supported on the frame adjacent opposite portions of the periphery of the tub, and a stop member mounted on the tub so as to engage and compress said first and second springs in turn as the tub reaches the respective ends of its arc of travel.

9. An electromagnetic drive system for a laundry tub as set forth in claim 8 in which said rotor is disposed in heat transfer relation to said tub.

10. An electromagnetic drive system for a laundry tub as set forth in claim 8 further including means for varying the speed at which said electromagnetic field moves along said rotor and thereby vary the speed of rotation of said tub.

11. An electromagnetic drive system for a laundry tub as set forth in claim 8 further including first and second proximity switches supported on said frame in diametrically opposed relation to the axis of said tub, first and second magnets carried by said tub and positioned so as to energize said first and second switches respectively as said tub reaches the respective ends of its arc of travel, and means energizable by said switches for reversing the phase relationship of the phases of alternating current supplied to said coils.

12. An electromagnetic drive system for a laundry tub as set forth in claim 11 further including means for shifting said switches away from the paths of movement of said magnets so as to render them inoperative.

13. An electromagnetic drive system for a laundry tub as set forth in claim 10 in which said speed varying means comprises switching means for selectively altering the paths of current flow in said coils so as to cause said coils to function either as full pitch coils or half pitch coils.

14. An electromagnetic drive system for a laundry tub as set forth in claim 8 including a collar supported on said frame for rotation about the axis of said tub, at least one radially positioned tension spring interconnecting said collar and said tub, and selectively operable means for fixedly securing said collar to said frame.

15. An electromagnetic drive system for a laundry tub mounted for rotation on a frame comprising an annular rotor secured to the tub in concentric relation to its axis of rotation, said rotor having a flat surface perpendicular to said axis, an arcuate stator secured to the frame in axially spaced face-to-face relation with said rotor, said stator having a plurality of coils of wire distributed along its length, and means for connecting said coils to a multiphase source of alternating current to produce a moving electromagnetic field along said stator so as to cause rotation of said rotor and tub, said stator being radially movable from an outer low speed position to an inner high speed position.

References Cited
UNITED STATES PATENTS

| | | | |
|---|---|---|---|
| 1,722,984 | 7/1929 | Hendry | 68—23 X |
| 1,816,033 | 7/1931 | Wilsey | 68—15 |
| 2,987,189 | 6/1959 | Evjen | 68—23 X |
| 3,194,032 | 7/1965 | VonBrimer | 68—23 |
| 3,216,226 | 11/1965 | Alger et al. | 68—23 |
| 3,248,908 | 5/1966 | Pope | 68—23 |

WILLIAM I. PRICE, *Primary Examiner.*